USOO5645608A

United States Patent [19]
Cooper et al.

[11] Patent Number: 5,645,608
[45] Date of Patent: Jul. 8, 1997

[54] COLD WATER WASH METHOD

[76] Inventors: Theodore R. Cooper, 1979 S. Wasatch Dr., Salt Lake City, Utah 84108; Allyson T. Toney, 1129 N. 3000 West, West Point, Utah 84015; John B. McParlane, 731 Fifth Ave., #4, Salt Lake City, Utah 84103

[21] Appl. No.: 633,573

[22] Filed: Apr. 17, 1996

Related U.S. Application Data

[62] Division of Ser. No. 582,612, Jan. 3, 1996.

[51] Int. Cl.$^6$ .............................. D06B 19/00; D06L 3/04
[52] U.S. Cl. ........................... 8/137; 8/111; 8/149.1; 8/149.2; 510/302; 510/303
[58] Field of Search ..................... 8/137, 111, 149.1, 8/149.2, 158; 510/302, 303

[56] References Cited

U.S. PATENT DOCUMENTS

| | | |
|---|---|---|
| 1,096,991 | 5/1914 | Blanchard . |
| 1,823,352 | 9/1931 | Crespi et al. . |
| 2,189,017 | 2/1940 | Rivat . |
| 2,529,802 | 11/1950 | Glass . |
| 3,065,620 | 11/1962 | Houser ........................... 68/13 R |
| 3,130,570 | 4/1964 | Rentzepis . |
| 3,194,628 | 7/1965 | Cannon . |
| 3,226,842 | 1/1966 | Morey . |
| 3,606,996 | 9/1971 | Wolf . |
| 3,659,096 | 4/1972 | Kompanek . |
| 3,674,216 | 7/1972 | Blair . |
| 3,778,229 | 12/1973 | Webster et al. . |
| 3,780,308 | 12/1973 | Nablo . |
| 3,836,786 | 9/1974 | Lowther . |
| 3,875,303 | 4/1975 | Hieber . |
| 3,877,152 | 4/1975 | Gorman . |
| 3,891,561 | 6/1975 | Lowther . |
| 3,899,683 | 8/1975 | Lowther . |
| 3,903,426 | 9/1975 | Lowther . |
| 3,904,521 | 9/1975 | Stopka . |
| 3,916,652 | 11/1975 | Speakman . |
| 3,919,433 | 11/1975 | Senior . |
| 3,954,586 | 5/1976 | Lowther . |
| 3,960,673 | 6/1976 | Morrow et al. . |
| 3,984,697 | 10/1976 | Lowther . |
| 3,996,474 | 12/1976 | Lowther . |
| 3,998,714 | 12/1976 | Armstrong . |
| 4,003,832 | 1/1977 | Henderson et al. . |
| 4,013,567 | 3/1977 | Emelyanov et al. . |
| 4,021,347 | 5/1977 | Teller et al. . |
| 4,035,296 | 7/1977 | Armstrong . |
| 4,035,301 | 7/1977 | Armstrong . |
| 4,045,347 | 8/1977 | Armstrong . |
| 4,053,399 | 10/1977 | Donnelly et al. . |
| 4,076,617 | 2/1978 | Bybel et al. . |
| 4,100,073 | 7/1978 | Hopcroft . |
| 4,101,296 | 7/1978 | Lowther . |
| 4,139,405 | 2/1979 | Seiberling . |
| 4,141,686 | 2/1979 | Lewis . |
| 4,145,007 | 3/1979 | Jetzer . |
| 4,159,944 | 7/1979 | Erickson et al. . |
| 4,171,056 | 10/1979 | Hannon et al. . |
| 4,204,955 | 5/1980 | Armstrong . |
| 4,214,330 | 7/1980 | Thorsen . |
| 4,219,415 | 8/1980 | Nassef et al. . |
| 4,227,653 | 10/1980 | Jetzer . |
| 4,242,310 | 12/1980 | Greff et al. . |
| 4,244,712 | 1/1981 | Tongret . |
| 4,255,663 | 3/1981 | Lewis . |
| 4,265,747 | 5/1981 | Copa et al. . |
| 4,283,251 | 8/1981 | Singh . |
| 4,300,367 | 11/1981 | Thorsen . |
| 4,304,673 | 12/1981 | Reynolds et al. . |
| 4,340,489 | 7/1982 | Adams et al. . |
| 4,343,765 | 8/1982 | Elston et al. . |
| 4,363,322 | 12/1982 | Andersson . |
| 4,375,812 | 3/1983 | Vaseen et al. . |
| 4,379,129 | 4/1983 | Abe . |
| 4,384,943 | 5/1983 | Stoner et al. . |
| 4,411,756 | 10/1983 | Bennett et al. . |
| 4,434,086 | 2/1984 | Hill et al. . |
| 4,462,880 | 7/1984 | Hill et al. . |
| 4,476,041 | 10/1984 | Hill et al. . |
| 4,488,973 | 12/1984 | Hill et al. . |
| 4,504,446 | 3/1985 | Kunicki et al. . |
| 4,535,247 | 8/1985 | Kurtz . |
| 4,578,185 | 3/1986 | Wilson et al. . |
| 4,595,498 | 6/1986 | Cohen et al. . |
| 4,617,230 | 10/1986 | Shah et al. . |
| 4,623,515 | 11/1986 | Frei et al. . |
| 4,625,432 | 12/1986 | Baltes . |
| 4,675,023 | 6/1987 | Hyink . |

(List continued on next page.)

FOREIGN PATENT DOCUMENTS 6-313194  11/1994  Japan .

OTHER PUBLICATIONS

Kurbiel, "Removal of Color, Detergents, and Other Refractory Substances from Textile Wastewater," *EPA–600/2–78–072*, pp. i–xiv, and 248–314, Mar. 1978.

Laundry Logic, Inc., "Laundry Logic Ozone Injection Systems," Bulletin No. OM–105, pp. 1–6, and 16 pages of tables. (Date Unknown).

Nazarov et al., "Ozonization of Waste (Sewage) in Textile Industry", *Tekstilnaia promushlennost*, pp. 1–13 and 52–56, Jun. 1984.

Rice et al., "Analytical Aspects of Ozone Treatment of Water and Wastewater," Lewis Publishers, Inc., pp. 41–90, 129–159, and 245–255, 1986. (Month Unknown).

*Primary Examiner*—Alan D. Diamond
*Attorney, Agent, or Firm*—Trask, Britt & Rossa

[57] ABSTRACT

A cold water washing method for reducing the soil load on a textile by introducing the textile and cold water into an internal assembly within a washing machine. The method includes a first break wash wherein the textile, water, and a solvent are introduced into the washing machine to initiate soil removal. In a second break wash, a surfactant and an alkali are added to the first break wash to continue the washing cycle. The combined first and second break washes are drained from the internal assembly and the textile is rinsed with water. After draining the first rinse from the internal assembly, a second rinse including ozonated water and an acid is introduced into the internal assembly. The second rinse is drained from the internal assembly and a third rinse, which includes ozonated water, is introduced into the internal assembly to rinse the textile.

20 Claims, 1 Drawing Sheet

U.S. PATENT DOCUMENTS

| | | |
|---|---|---|
| 4,752,401 | 6/1988 | Bodenstein . |
| 4,767,405 | 8/1988 | Lokken . |
| 4,772,411 | 9/1988 | Sprecker et al. . |
| 4,780,277 | 10/1988 | Tanaka et al. . |
| 4,804,449 | 2/1989 | Sweeney . |
| 4,813,210 | 3/1989 | Masuda et al. . |
| 4,818,488 | 4/1989 | Jacob . |
| 4,822,563 | 4/1989 | Joslyn . |
| 4,869,872 | 9/1989 | Baltes . |
| 4,881,941 | 11/1989 | Dixon . |
| 4,912,058 | 3/1990 | Mussi et al. . |
| 4,915,955 | 4/1990 | Gömöri . |
| 4,917,586 | 4/1990 | Jacob . |
| 4,941,270 | 7/1990 | Hoffman . |
| 4,954,321 | 9/1990 | Jensen . |
| 4,962,090 | 10/1990 | Sprecker et al. . |
| 4,963,285 | 10/1990 | Sprecker et al. . |
| 4,966,717 | 10/1990 | Kern . |
| 4,976,920 | 12/1990 | Jacob . |
| 4,990,494 | 2/1991 | Narula et al. . |
| 4,995,123 | 2/1991 | Kern . |
| 5,004,587 | 4/1991 | Tacchi . |
| 5,008,548 | 4/1991 | Gat . |
| 5,014,211 | 5/1991 | Turner et al. . |
| 5,024,766 | 6/1991 | Mahmud . |
| 5,041,483 | 8/1991 | Burch . |
| 5,053,140 | 10/1991 | Hurst . |
| 5,073,488 | 12/1991 | Matner et al. . |
| 5,089,098 | 2/1992 | Tacchi . |
| 5,097,556 | 3/1992 | Engel et al. ................................. 8/158 |
| 5,107,605 | 4/1992 | Yamada et al. . |
| 5,118,322 | 6/1992 | Wasinger et al. . |
| 5,123,176 | 6/1992 | Yamada et al. . |
| 5,154,895 | 10/1992 | Moon . |
| 5,171,525 | 12/1992 | Jacob . |
| 5,180,502 | 1/1993 | Nishiki et al. . |
| 5,181,399 | 1/1993 | Engel et al. . |
| 5,187,137 | 2/1993 | Terui et al. . |
| 5,200,158 | 4/1993 | Jacob . |
| 5,207,237 | 5/1993 | Langford . |
| 5,211,919 | 5/1993 | Conrad . |
| 5,213,773 | 5/1993 | Burris . |
| 5,223,401 | 6/1993 | Foltz et al. . |
| 5,236,512 | 8/1993 | Rogers et al. . |
| 5,241,720 | 9/1993 | Engel et al. . |
| 5,244,585 | 9/1993 | Sugimoto . |
| 5,245,845 | 9/1993 | Langford . |
| 5,252,484 | 10/1993 | Matner et al. . |
| 5,258,409 | 11/1993 | Gay . |
| 5,261,925 | 11/1993 | Wasinger et al. . |
| 5,262,129 | 11/1993 | Terada et al. . |
| 5,280,876 | 1/1994 | Atkins . |
| 5,286,447 | 2/1994 | Fannin et al. . |
| 5,286,700 | 2/1994 | Terui et al. . |
| 5,302,343 | 4/1994 | Jacob . |
| 5,306,471 | 4/1994 | Harbert et al. . |
| 5,313,811 | 5/1994 | Wasinger et al. . |
| 5,322,637 | 6/1994 | O'Grady . |
| 5,325,600 | 7/1994 | Gentile . |
| 5,332,511 | 7/1994 | Gay et al. . |
| 5,348,724 | 9/1994 | Hagimori et al. . |
| 5,353,745 | 10/1994 | Fahs, II . |
| 5,360,556 | 11/1994 | Ball et al. . |
| 5,366,746 | 11/1994 | Mendenhall . |
| 5,370,793 | 12/1994 | Sugimoto . |
| 5,373,025 | 12/1994 | Gay . |
| 5,384,933 | 1/1995 | Wang . |
| 5,387,350 | 2/1995 | Mason . |
| 5,393,490 | 2/1995 | Jacob . |
| 5,404,732 | 4/1995 | Kim ........................................ 68/13 R |
| 5,409,616 | 4/1995 | Garbutt et al. . |
| 5,418,167 | 5/1995 | Matner et al. . |
| 5,422,068 | 6/1995 | Shalaby et al. . |
| 5,422,185 | 6/1995 | Egami et al. . |
| 5,423,902 | 6/1995 | Strutz et al. . |
| 5,424,515 | 6/1995 | Gentile . |
| 5,427,693 | 6/1995 | Mansgrover et al. . |
| 5,433,866 | 7/1995 | Hoppe et al. . |
| 5,433,919 | 7/1995 | Baltes . |
| 5,433,927 | 7/1995 | Mausgrover et al. . |
| 5,443,801 | 8/1995 | Langford . |
| 5,444,102 | 8/1995 | Nimitz et al. . |
| 5,451,368 | 9/1995 | Jacob . |
| 5,456,809 | 10/1995 | Cooper . |
| 5,460,705 | 10/1995 | Murphy et al. . |
| 5,484,549 | 1/1996 | Hei et al. ................................. 510/370 |
| 5,493,743 | 2/1996 | Schneider et al. ...................... 8/149.2 |

COLD WATER WASH METHOD

This is a division of application Ser. No. 08/582,612, filed Jan. 3, 1996.

TECHNICAL FIELD

The present invention relates generally to a method of cold water washing to clean and deodorize textiles. More specifically, this invention relates to a method of washing textiles that utilizes ozone, surfactants, solvents, acids and alkalis to increase the efficiency of the laundry wash process.

BACKGROUND

Ozone ($O_3$) is a triatomic allotrope of oxygen in which the ozone molecule consists of three oxygen atoms in contrast to the two oxygen atoms which comprise the typical oxygen molecule ($O_2$). Ozone can be generated by passing air or oxygen through a high intensity electric field. Some of the oxygen molecules will be energized and will split into two separate atoms. These individual oxygen atoms will then form weak bonds with other oxygen molecules. The ozone molecule is oxygen in a highly reactive form, which has a tendency to give up its extra oxygen atom and gain electrons. This molecular structure gives ozone its high oxidizing power which allows ozone to react rapidly with a large variety of compounds.

Although ozone has been primarily employed in disinfection of culinary water and municipal waste water treatment, it can perform other functions such as color reduction, odor and taste removal, and oxidation of inorganic and organic compounds in water.

Ozone acts as a positively charged molecule that is electron deficient. Organic and hydrocarbon stains such as greases, fats, and oils have centers of high electron density and carry a negative charge. When ozone is introduced into a washing machine, it is attracted to these molecules and subsequently reacts chemically with the soil in an oxidation process. The kinetics of the reaction between soil and ozone is very high; thus, the reaction between these two substances is extremely fast. Ozone will begin to react within a fraction of a second after contact. In the process, ozone will give up its third oxygen atom, which will chemically bond with the soil molecule. An oxygen atom is highly electronegative and when added to a soil molecule, the electronegative charge will cause the chemical double bond of the molecule to polarize (reverse charge). Polarization will cause a large soil molecule to fragment into several smaller molecules. The strength of attachment between soil and a textile is largely a function of the size of the soil molecule. Smaller soil molecules will be more easily removed from the textile. The size of the molecule also has a direct effect on the solubility of the soil whereby a reduction in molecular size of the soil will greatly increase the amount of soil that is dissolved in the wash liquor.

Surfactants and alkalis are used in most laundry detergents. Their main purpose is to suspend soil by bonding with the soil molecules to prevent redeposition of the soil. Additionally, surfactants play a key role in loosening of the soil. Some soils can be removed from the textile surface by mechanical action and water alone, but the majority cannot. Thus, a major part of the role of the surfactant is to loosen and dissolve soil from the textile. However, this task can be facilitated by ozone. A primary purpose of ozone in laundry processing is to remove the soil from the textile through polarization. A secondary purpose is to oxidize the soil molecules, making it more soluble and allowing for faster precipitation. Ozone is in a highly reactive gaseous form in laundry processing, allowing it to react with and remove soil at a greatly increased rate which accounts for a substantial reduction in processing time.

Alkalis are used for controlling the pH and active alkalinity of the wash water. Alkalis bond with cations, such as calcium and magnesium, allowing surfactants to react with soils more effectively. Alkalis can sequester the hardness in water and can prevent calcium and magnesium from forming insoluble soaps. Alkalis have superior soil suspending properties which contribute to the function of surfactants and ozone. Thus, when using ozone as a wash chemical, it is only necessary to use a small mount of alkali on heavy industrial soil and in the bleach cycle for pH control.

Solvents are used to hold other substances, such as surfactants and alkalis, in solution and dissolve soils found on the textile to be cleaned.

The use of ozone in the laundry process reduces or eliminates the need for other laundry chemicals and finishing products such as antichlor, "sour", bactericides, and mildewcides. Antichlor is used to neutralize any residual chlorine bleach. Ozone oxidizes chlorine bleach and completely neutralizes it. For this reason, ozone is not used in a chlorine bleach cycle. However, since ozone has bleaching capability, the need for chlorine bleach is reduced and, consequently, the need for antichlor is likewise reduced. Sour is used to neutralize the effects of alkali on the pH of the wash solution. Since the use of ozone greatly reduces the need for alkali, the need for sour is also reduced or altogether eliminated.

Ozone is the strongest oxidant commercially available for the treatment of water. Due to ozone's high oxidation potential, the duration of the wash cycle can be reduced relative to those cycles using chlorine as an oxidant, while attaining the same or higher oxidative capabilities. Wash temperatures and alkalinity can also be reduced. These contribute to increased textile life by decreasing stress on the fabric through limited mechanical action, more neutral pH's and lower temperatures. It also enhances washroom throughput.

It would be an improvement in the art to have a relatively economical, reliable cold water washing formula and method of washing and deodorizing textiles such as garments or linens.

DISCLOSURE OF THE INVENTION

Surprisingly, it has been found that a cold water wash method utilizing ozonated water together with a surfactant, a solvent, an alkali, and an acid, results in a synergistic cleaning combination. Additional benefits from using ozone in laundry processing include dramatically increased washroom capacity due to decrease in processing or "formula" time, reduction in washroom labor, increased textile life, reduced water usage, and reduced utility consumption. The resulting soil oxide is easier to remove and suspend which allows for the use of greatly reduced break and suds events and the removal of some of the flushes. Due to ozone's high oxidation potential, excellent wash results can be achieved using only about half of the amount of surfactants usually required in washes using non-ozonated water. By using less chemicals, less rinsing is required to remove the chemicals. The reduction in the number of formula events results in a substantial decrease in water usage and a subsequent decrease in the volume of material discharged to sewers.

The present invention includes a cold water wash formula and methods of using the cold water wash to clean textiles.

In particular, the invention concerns the use of ozone, a surfactant, a solvent, an acid, and an alkali for the purpose of cleaning heavily soiled textiles.

In one embodiment, the washing method comprises introducing the textile and a "first break wash" into the internal assembly of a washing machine, thus wetting the textile with the water and solvent in order to initiate soil removal. A "break wash" is a chemical bath wherein a surfactant, a solvent, and/or an alkali is added to a wash to initiate soil removal. The first break wash comprises water and a solvent. A second break wash, comprising a surfactant and an alkali, is added to the existing mixture. The resulting first and second break wash mixture is drained from the internal assembly of the washing machine. The textiles are then rinsed with, for example, water.

Following the initial rinse step, a combination of ozone gas, oxygen and/or oxygen enriched air is mixed into a liquid mixture, comprising water and an acid, to form an ozonated wash mixture. The ozonated wash mixture is then removed and the textiles are rinsed with ozonated water.

Throughout the described embodiment, the textiles are contacted with the various mixtures of wash liquids and rinses at temperatures ranging from about 40° F. (4° C.) to about 120° F. (49° C.). Throughout various steps of the method, the textiles are contacted by ozonated water, either alone or in combination with other described ingredients, for a period of time ranging from about 1 to about 30 minutes. The total wash time of the method ranges from about 25 to about 125 minutes.

BEST MODE OF THE INVENTION

Figure 1:
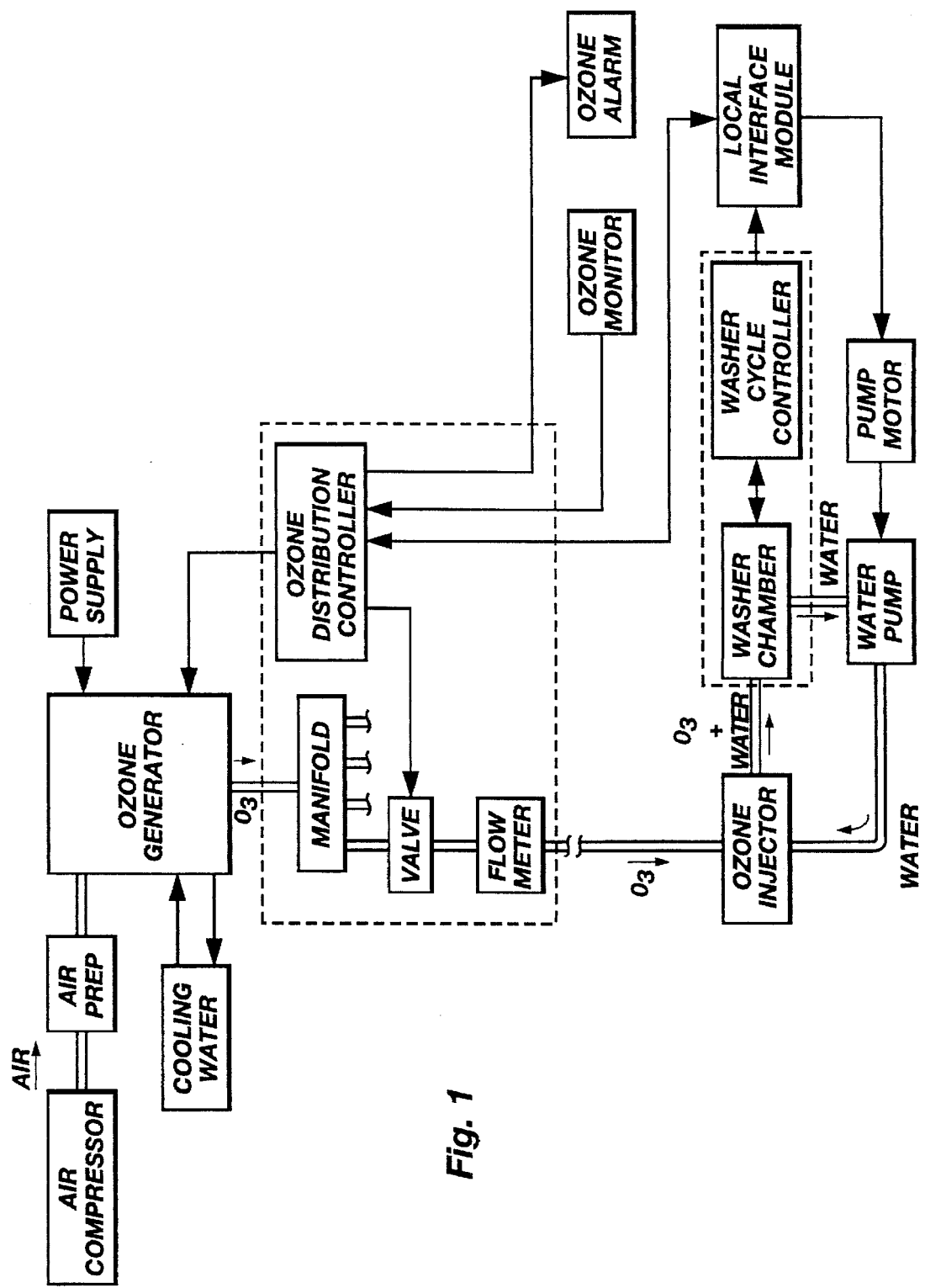
FIG. 1 block diagram illustrating the principal components of a washing machine utilizing an ozone injection system which may be used to carry out the method of the present invention.

The cold water (i.e. water below a temperature of about 125° F. (about 52° C.)) washing method includes sufficient amounts of the selected ingredients within each of the appropriate operational steps to clean and deodorize textiles. The actual amounts of ingredients will be highly dependent upon the amount and type of soils found on the textiles to be washed.

In a preferred mode, the method is carried out in five steps, consisting of two break operations followed by three rinse operations. The first break operation comprises introducing the textile, water, and a solvent into the internal assembly of a washing machine (FIG. 1) in order to initiate soil removal from the textile. The first break operation lasts for a period of time from about 1 minute to about 30 minutes and is maintained at a temperature range of from about 80° F. (27° C.) to about 120° F. (49° C.). The second break operation comprises adding surfactants and an alkali to the contents of the first break operation. The second break operation lasts for a period of time from about 1 minute to about 30 minutes and is maintained at a temperature range of about 80° F. (27° C.) to about 120° F. (49° C.). The liquid contents of the internal assembly of the washing machine are drained, leaving the wetted textile within the internal assembly of the washing machine.

The first rinse operation comprises rinsing the textiles with a first rinse solution which includes water (e.g. "softened" water). Preferably, a high water level, consisting of from about 35 to about 56 liters (ten to about fifteen gallons) of water per five to ten kilograms (10 to 20 pounds) of laundry, is used in the first rinse operation. The first rinse operation is preferably maintained at a temperature range of about 80° F. (27° C.) to about 120° F. (49° C.) and lasts for a period of time from about 1 minute to about 10 minutes. After completion of the first rinse operation, the water is drained from the internal assembly of the washing machine.

The second rinse operation comprises rinsing the textiles with a second rinse solution containing ozonated water and an acid. The ozonated water contains ozone at a concentration, in the gaseous phase, of up to about 15% by weight. The second rinse operation is preferably maintained at a temperature range of about 80° F. (27° C.) to about 110° F. (43° C.) and lasts for a period of time from about 1 minute to about 10 minutes.

Upon completion of the second rinse operation, the liquids are drained from the internal assembly of the washing machine.

The third rinse operation comprises rinsing the textiles with a third rinse solution comprising ozonated water. The ozonated water of the third rinse operation contains ozone at a concentration, in the gaseous phase, of up to about 15% by weight. The third rinse operation is preferably maintained at a temperature range of about 70° F. (21° C.) to about 100° F. (38° C.) and lasts for a period of time from about 1 minute to about 10 minutes.

Methods of generating ozone and producing ozonated liquids are respectively disclosed in U.S. Pat. No. 5,213,773 to Burris, May 25, 1993, and in U.S. Pat. No. 5,181,399 to Engel et al., Jan. 26, 1993, the contents of which are incorporated herein by reference. In one preferred mode, the ozone gas is generated from oxygen or oxygen-enriched air by a corona discharge device that produces concentrations ranging between about 1% to about 15% by weight of ozone. The combination of ozone gas, oxygen and/or oxygen enriched air introduced into the liquid mixture comprises bubbles of gas having a size from about 5 microns to about 5000 microns in diameter entrained in the liquid portion of the liquid mixture.

In this mode, the concentration of ozone in the ozonated wash liquid ranges from about 0.01 ppm to about 50 ppm depending upon the nature of the textile and the soil type and content. The pH of the ozonated wash liquid is maintained at a pH from about 3 to about 6. The pH of the liquid mixture throughout the entire method (i.e. ozonated and non-ozonated steps) is maintained at a pH from about 3 to about 13. The preferred pH range is from about 4.4 to about 11.8. The temperature of the wash liquor is preferably maintained at a temperature in the range of about 50° F. (10° C.) to about 110° F. (43° C.).

Preferably, the method will use non-ionic surfactants. Preferred non-ionic surfactants contain either an alkyl ethoxylate or nonylphenol surfactants as a principal ingredient, and are commercially available under the trade designations "STAUNCH" and "RD-88" (both available from Unichem Corp., Chicago, Ill.).

A preferred solvent, containing terpene hydrocarbons in combination with a citrus extract, is D-limonene, commercially available from Van Waters & Rogers, Salt lake City, Utah. Other preferred solvents include mineral spirits, petroleum-based solvents, terpene hydrocarbons, citrus based solvents, or a combination thereof. Compositions containing a combination of mineral spirits and petroleum-based solvents as principal ingredients are commercially available under the trade designations "RESERVE BASE" (available from Unichem Corp., Chicago, Ill.) and "FB SPECIAL" (available from Diversey Wyandotte Corp., Wyandotte, Mich.).

Water is preferably used in the present invention as a carrier for ozone molecules.

Preferred alkalis include sodium metasilicate, potassium orthosilicate, sodium orthosilicate, potassium metasilicate, sodium hydroxide, potassium hydroxide, and mixtures thereof.

Preferred acids include organic acids, mineral acids, and mixtures thereof. The acid used in the preferred mode is acetic acid, from Fisher Scientific, Fair Lawn, N.J. However, it should be understood that any comparable acid known in the art capable of modifying the pH of the cold water wash without damaging the textile or washing machine can be used.

Another preferred method further includes a "sudsing" operation (also known as a "suds wash") following the first rinse operation and a final rinse operation following the third rinse operation of the previously described preferred method. A "sudsing" operation is a chemical bath occurring between the break bath and the bleach bath or rinse cycle. The sudsing operation comprises introducing ozoneted water, a surfactant, a solvent, an acid, and a suspending agent to the textiles, said textiles having been subjected to two break operations and one rinse operation. The sudsing operation lasts for a period of time from about 1 minute to about 30 minutes and is maintained at a temperature range of about 80° F. (27° C.) to about 120° F. (49° C.). The pH of the sudsing liquid is preferably maintained at a range from about 3 to about 6. After completion of the sudsing operation, the liquid contents of the internal assembly of the washing machine are drained.

The final rinse operation comprises rinsing the textiles with non-ozonated water. The final rinse operation lasts for a period of time from about 1 minute to about 10 minutes and is maintained at a temperature range of about 50° F. (10° C.) to about 80° F. (27° C.). The pH is maintained at a range from about 6 to about 9. The method is completed by draining the rinse solution.

As used herein, "draining" or "removing" a liquid from the washing machine or one of its components involves the removal of a majority of the liquid from the machine or its components so as not to substantially interfere with the next step in the process or the process itself. Complete removal of liquid is of course not necessary, and nearly always some rinse, wash or suds liquid will remain associated with the textile to be cleaned.

A preferred suspending agent is carboxymethyl cellulose, available from Sigma Chemical Co., St. Louis, Mo. It is understood that other comparable suspending agents known in the art capable of maintaining the chemicals used in the present method in solution can be used (e.g. sodium metasilicate and sodium polyacrylate).

The following illustrative examples may help to explain the invention:

EXAMPLE I

A method of cold water washing to clean and deodorize textiles was conducted as follows:

| Operation | Quantity Used | Water Level | Time (min.) | Temp | pH |
|---|---|---|---|---|---|
| Step 1: Break (no drain) solvent (FB SPECIAL) | 50 ml | 7.75 gal (29.4 liters) | 8 | 95° F. (35° C.) | 8.0 |
| Step 2: Break Na metasilicate surfactant (RD-88) surfactant (Staunch) | 100 g 25 ml 2 ml | 7.75 gal (29.4 liters) | 5 | 95° F. (35° C.) | 11.8 |
| Step 3: Rinse No chemical additions | | 13 gal (49.2 liters) | 3 | 95° F. (35° C.) | 11.4 |
| Step 4: Rinse 4% ozone (w/w) acetic acid | 20 ml | 13 gal (49.2 liters) | 8 | 80° F. (27° C.) | 4.4 |
| Step 5: Rinse 4% ozone (w/w) | | 13 gal (49.2 liters) | 3 | 70° F. (21° C.) | 5.2 |

The cold water wash method was conducted on a 30 pound capacity "SPEED QUEEN" washing machine, available from Speed Queen Company, Ripon, Wis. The wash method was performed on heavily soiled textiles. The method of EXAMPLE I resulted in a thoroughly cleansed and deodorized wash load.

EXAMPLE II

A method of cold water washing to clean and deodorize textiles was conducted as follows:

| Operation | Quantity Used | Water Level | Time (min.) | Temp | pH |
|---|---|---|---|---|---|
| Step 1: Break (no drain) solvent (FB SPECIAL) | 100 ml | 7.75 gal (29.4 liters) | 10 | 105° F. (41° C.) | 8.0 |
| Step 2: Break Na metasilicate surfactant (RD-88) surfactant (STAUNCH) D-limonene | 200 g 45 ml 5 ml 10 ml | 7.75 gal (29.4 liters) | 8 | 105° F. (41° C.) | 11.8 |
| Step 3: Rinse No chemical additions | | 13 gal (49.2 liters) | 5 | 105° F. (41° C.) | 11.4 |
| Step 4: Suds 6% ozone (w/w) surfactant (RD-88) D-limonene Carboxymethyl-cellulose acetic acid | 25 ml 10 ml 1 g 65 ml | 7.75 gal (29.4 liters) | 10 | 90° F. (32° C.) | 4.4 |
| Step 5: Ozone 6% ozone (w/w) acetic acid | 15 ml | 13 gal (49.2 liters) | 15 | 80° F. (27° C.) | 4.4 |
| Step 6: Rinse 6% ozone (w/w) | | 13 gal (49.2 liters) | 3 | 70° F. (21° C.) | 5.2 |
| Step 7: Rinse No chemical additions | | 13 gal (49.2 liters) | 3 | 60° F. (16° C.) | 7.8 |

The cold water wash method was conducted on a 30 pound capacity "SPEED QUEEN" washing machine. The wash method was performed on heavily soiled textiles. The method of EXAMPLE II resulted in a thoroughly cleansed and deodorized wash load.

EXAMPLE III

A method of cold water washing to clean and deodorize textiles was conducted using the same method as described in EXAMPLE II, except that the concentration of chemicals used was reduced by 50 percent. The ozone concentrations in steps 4, 5, and 6 remained constant. The heavily soiled textiles washed in EXAMPLE III were substantially similar with respect to soil content as those used in EXAMPLE II.

| Operation | Quantity Used | Water Level | Time (min.) | Temp | pH |
|---|---|---|---|---|---|
| Step 1: Break (no drain) solvent (FB SPECIAL) | 50 ml | 7.75 gal (29.4 liters) | 10 | 105° F. (41° C.) | 8.0 |
| Step 2: Break Na metasilicate surfactant (RD-88) surfactant (STAUNCH) D-limonene | 100 g 22.5 ml 2.5 ml 5 ml | 7.75 gal (29.4 liters) | 8 | 105° F. (41° C.) | 11.8 |
| Step 3: Rinse No chemical additions | | 13 gal (49.2 liters) | 5 | 105° F. (41° C.) | 11.4 |
| Step 4: Suds 6% ozone (w/w) surfactant (RD-88) D-limonene Carboxymethyl-cellulose acetic acid | 12.5 ml 5 ml .5 g 32.5 ml | 7.75 gal (29.4 liters) | 10 | 90° F. (32° C.) | 4.4 |
| Step 5: Ozone 6% ozone (w/w) acetic acid | 7.5 ml | 13 gal (49.2 liters) | 15 | 80° F. (27° C.) | 4.4 |
| Step 6: Rinse 6% ozone (w/w) | | 13 gal (49.2 liters) | 3 | 70° F. (21° C.) | 5.2 |
| Step 7: Rinse No chemical additions | | 13 gal (49.2 liters) | 3 | 60° F. (16° C.) | 7.8 |

The results of the method of EXAMPLE III were substantially indistinguishable from the results described in EXAMPLE II.

EXAMPLE IV

A method of cold water washing to clean and deodorize textiles was conducted using the same method as described in EXAMPLE II, except that the concentration of chemicals used was increased by 100 percent. The ozone concentrations in steps 4, 5, and 6 remained constant. The heavily soiled textiles washed in EXAMPLE IV were substantially similar with respect to soil content as those used in EXAMPLE II.

| Operation | Quantity Used | Water Level | Time (min.) | Temp | pH |
|---|---|---|---|---|---|
| Step 1: Break (no drain) solvent (FB SPECIAL) | 200 ml | 7.75 gal (29.4 liters) | 10 | 105° F. (41° C.) | 8.0 |
| Step 2: Break Na metasilicate surfactant (RD-88) surfactant (STAUNCH) D-limonene | 400 g 90 ml 10 ml 20 ml | 7.75 gal (29.4 liters) | 8 | 105° F. (41° C.) | 11.8 |
| Step 3: Rinse No chemical additions | | 13 gal (49.2 liters) | 5 | 105° F. (41° C.) | 11.4 |
| Step 4: Suds 6% ozone (w/w) surfactant (RD-88) D-limonene Carboxymethyl-cellulose acetic acid | 50 ml 20 ml 2 g 130 ml | 7.75 gal (29.4 liters) | 10 | 90° F. (32° C.) | 4.4 |
| Step 5: Ozone 6% ozone (w/w) acetic acid | 30 ml | 13 gal (49.2 liters) | 15 | 80° F. (27° C.) | 4.4 |
| Step 6: Rinse 6% ozone (w/w) | | 13 gal (49.2 liters) | 3 | 70° F. (21° C.) | 5.2 |
| Step 7: Rinse No chemical additions | | 13 gal (49.2 liters) | 3 | 60° F. (16° C.) | 7.8 |

The results of the method of EXAMPLE IV were substantially indistinguishable from the results described in EXAMPLE II.

EXAMPLE V

A method of cold water washing to clean and deodorize textiles was conducted using the same method as described in EXAMPLE I, except that the organic solvent combination used in the break operation of step 1 was "RESERVE BASE" instead of "FB SPECIAL". All other ingredients, quantities, and durations were similar to those found in EXAMPLE I. The heavily soiled textiles washed in EXAMPLE V were substantially similar with respect to soil content as those used in EXAMPLE I. The results of the method of EXAMPLE V were substantially indistinguishable from the results described in EXAMPLE I.

EXAMPLE VI

A method of cold water washing to clean and deodorize textiles was conducted using the same method as described in EXAMPLE II except that the organic solvent combination used in the break operation of step 1 was "RESERVE BASE" instead of "FB SPECIAL". All other ingredients, quantities, and durations were similar to those found in EXAMPLE II. The heavily soiled textiles washed in EXAMPLE VI were substantially similar with respect to soil content as those used in EXAMPLE II. The results of the method of EXAMPLE VI were substantially indistinguishable from the results described in EXAMPLE II.

Reference herein to specific embodiments or examples should not be interpreted as limitations to the scope of the invention, which is defined by the appended claims.

What is claimed is:

1. A method of reducing the soil load on a soiled textile using cold water in a washing machine containing the textile, the washing machine having an outer shell for containing fluids and an internal assembly for containing the textile and fluids, said method comprising:

introducing a first break wash into the outer shell and internal assembly, thus contacting the textile with the first break wash and wetting the textile, said first break wash comprising cold water and an organic solvent;

combining a second break wash with the first break wash in the outer shell and internal assembly, said second break wash comprising water, a surfactant, and an alkali;

removing the combined first and second break washes and any associated soil from the internal assembly and the outer shell;

introducing a first rinse solution into the outer shell and internal assembly, thus contacting the textile with said first rinse solution, said first rinse solution comprising cold water;

removing the first rinse solution and any soil associated therewith from the internal assembly and the outer shell;

introducing a second rinse solution into the outer shell and internal assembly to contact said second rinse solution with the textile, said second rinse solution comprising ozonated cold water and an acid;

removing the second rinse solution and any associated soil from the internal assembly and the outer shell; and introducing a third rinse solution into the outer shell and internal assembly to contact the textile with said third rinse solution, said third rinse solution comprising ozonated cold water, thereby reducing the soil load on the textile.

2. The method of claim 1, wherein the textile is contacted with said first break wash for a period of time of about 1 minute to about 30 minutes.

3. The method of claim 1, wherein the textile is in contact with said combined first break wash and second break wash for a period of timed of about 1 minute to about 30 minutes.

4. The method of claim 1, wherein the textile is contacted with said first rinse solution for a period of time of about 1 minute to about 10 minutes.

5. The method of claim 1, wherein the textile is contacted with said second rinse solution for a period of time of about 1 minute to about 10 minutes.

6. The method of claim 1, wherein the textile is contacted with said third rinse solution for a period of time of about 1 minute to about 10 minutes.

7. The method of claim 1, wherein said solvent is selected from the group consisting of mineral spirits, petroleum based solvents, terpene hydrocarbons, citrus based solvents, and mixtures thereof.

8. The method of claim 1, wherein said surfactant is a non-ionic surfactant.

9. The method of claim 8, wherein said surfactant comprises an alkyl ethoxylate.

10. The method of claim 8, wherein said surfactant comprises a nonylphenol suffactant.

11. The method of claim 1, wherein said acid is selected from the group consisting of organic acids, mineral acids, and mixtures thereof.

12. The method of claim 11, wherein said acid is acetic acid.

13. The method of claim 1, wherein said alkali is selected from the group consisting of sodium metasilicate, potassium orthosilicate, sodium orthosilicate, potassium metasilicate, sodium hydroxide, and potassium hydroxide.

14. The method of claim 1, wherein the internal assembly's temperature is maintained at a temperature from about 4° C. to about 49° C.

15. The method of claim 1, wherein said ozonated cold water comprises bubbles of ozone gas having a size from about 5 microns to about 5000 microns in diameter.

16. The method of claim 1, wherein the concentration of ozone in the ozonated cold water in the second or third rinse solutions ranges from about 0.01 ppm to about 50 ppm.

17. The method of claim 1, wherein the pH of the ozonated cold water of said second rinse solution is maintained at a range from about 3 to about 6.

18. The method of claim 1, wherein the pH of said first break wash, said second break wash, said first rinse solution, said second rinse solution, and said third rinse solution are maintained in a range of from about 3 to about 13.

19. A method of reducing the soil load on a soiled textile using cold water in a washing machine containing the textile, said washing machine having an outer shell for containing fluids and an internal assembly for containing the textile and fluids, said method comprising:

introducing a first break wash into the outer shell and internal assembly, thus contacting the textile with the first break wash and wetting the textile, said first break wash comprising an organic solvent and cold water;

combining a second break wash with the first break wash in the outer shell and internal assembly, said second break wash comprising cold water, a surfactant, and an alkali;

removing the combined first break wash and second break washes and any associated soil from the internal assembly and the outer shell;

introducing a first rinse solution into the outer shell and internal assembly, thus contacting the textile with said first rinse solution, said first rinse solution comprising cold water;

removing the first rinse solution and any associated soil from the internal assembly and the outer shell;

introducing a suds wash into the outer shell and internal assembly, said suds wash comprising a surfactant, a solvent, an acid, and a suspending agent;

removing the suds wash and any associated soil from the internal assembly and the outer shell;

introducing a second rinse solution into the outer shell and internal assembly, said second rinse solution comprising ozonated cold water and an acid;

removing the second rinse solution and any associated soil from the internal assembly and the outer shell;

introducing a third rinse solution into the outer shell and internal assembly, said third rinse solution comprising ozonated cold water;

removing the third rinse solution and any associated soil from the internal assembly and the outer shell; and introducing a fourth rinse solution into the outer shell and internal assembly, said fourth rinse solution comprising cold water, thereby reducing the soil load on the textile.

20. The method of claim 19, wherein the suspending agent of the suds wash is selected from the group consisting of carboxymethyl cellulose, sodium metasilicate, and mixtures thereof.

* * * * *

UNITED STATES PATENT AND TRADEMARK OFFICE
CERTIFICATE OF CORRECTION

PATENT NO. : 5,645,608
DATED : July 8, 1997
INVENTOR(S) : Cooper et al.

It is certified that error appears in the above-identified patent and that said Letters Patent is hereby corrected as shown below:

In Column 5, line 25, change "ozoneted: to --ozonated--;

In Column 8, line 66, after "comprising" insert --cold--;

In Column 9, line 47, change "suffactant" to --surfactant--.

Signed and Sealed this

Thirty-first Day of March, 1998

Attest:

BRUCE LEHMAN

Attesting Officer

Commissioner of Patents and Trademarks